US010087960B2

(12) United States Patent
Wagers

(10) Patent No.: US 10,087,960 B2
(45) Date of Patent: Oct. 2, 2018

(54) HYDRAULIC DISPLACEMENT CONTROL SYSTEM

(71) Applicant: Raven Industries, Inc., Sioux Falls, SD (US)

(72) Inventor: Jesse Wagers, Sioux Falls, SD (US)

(73) Assignee: Raven Industries, Inc., Sioux Falls, SD (US)

(*) Notice: Subject to any disclaimer, the term of this patent is extended or adjusted under 35 U.S.C. 154(b) by 296 days.

(21) Appl. No.: 15/033,363

(22) PCT Filed: Oct. 29, 2014

(86) PCT No.: PCT/US2014/062903
§ 371 (c)(1),
(2) Date: Apr. 29, 2016

(87) PCT Pub. No.: WO2015/066182
PCT Pub. Date: May 7, 2015

(65) Prior Publication Data

US 2016/0252109 A1 Sep. 1, 2016

Related U.S. Application Data

(60) Provisional application No. 61/896,944, filed on Oct. 29, 2013.

(51) Int. Cl.
*F16D 31/02* (2006.01)
*F15B 15/04* (2006.01)
(Continued)

(52) U.S. Cl.
CPC ............ *F15B 15/04* (2013.01); *F15B 11/161* (2013.01); *F15B 15/088* (2013.01);
(Continued)

(58) Field of Classification Search
CPC ....... F15B 11/16; F15B 11/161; F15B 11/165; F16H 61/4008; F16H 61/4035;
(Continued)

(56) References Cited

U.S. PATENT DOCUMENTS 3,995,425 A * 12/1976 Wittren ................. F15B 11/165 60/445
4,722,186 A 2/1988 Louis et al.
(Continued)

FOREIGN PATENT DOCUMENTS

EP 0023486 B1 5/1984
EP 0122770 A1 10/1984
(Continued)

OTHER PUBLICATIONS

"International Application Serial No. PCT/US2014/062903, International Preliminary Report on Patentability dated May 12, 2016", 9 pgs.

(Continued)

*Primary Examiner* — Michael Leslie
(74) *Attorney, Agent, or Firm* — Schwegman Lundberg & Woessner, P.A.

(57) ABSTRACT

A load based pressure and flow control system including a variable displacement hydraulic motor and a flow control valve coupled with a motor inlet. A motor inlet pressure sensor is interposed between the variable displacement hydraulic motor and the flow control valve, the motor inlet pressure sensor configured to measure a motor inlet pressure at the motor inlet. An output sensor is coupled with a motor output of the variable displacement hydraulic motor and configured to measure an output characteristic of the variable displacement hydraulic motor. A displacement and flow controller of the system is configured to change displacement of the variable displacement hydraulic motor accord- (Continued)

ing to a pressure difference across the flow control valve between the measured motor inlet pressure and a hydraulic system pressure, and change a flow rate of hydraulic fluid through the flow control valve according to the measured output characteristic of the hydraulic motor.

35 Claims, 7 Drawing Sheets

(51) Int. Cl.

| | |
|---|---|
| ***F15B 11/16*** | (2006.01) |
| ***F16H 61/4008*** | (2010.01) |
| ***F16H 61/46*** | (2010.01) |
| ***F16H 61/421*** | (2010.01) |
| ***F16H 61/4035*** | (2010.01) |
| ***F16H 61/4061*** | (2010.01) |
| ***F15B 15/08*** | (2006.01) |
| ***F15B 15/20*** | (2006.01) |

(52) U.S. Cl.
CPC ....... *F15B 15/204* (2013.01); *F16H 61/4008* (2013.01); *F16H 61/4035* (2013.01); *F16H 61/4061* (2013.01); *F16H 61/421* (2013.01); *F16H 61/46* (2013.01)

(58) Field of Classification Search
CPC .... F16H 61/4061; F16H 61/421; F16H 61/46; F16H 61/468; F16H 61/47; F16H 61/472
USPC ........................................................... 60/448
See application file for complete search history.

(56) References Cited

U.S. PATENT DOCUMENTS

| | | | | |
|---|---|---|---|---|
| 5,326,230 | A | 7/1994 | Fischer et al. | |
| 5,682,742 | A | 11/1997 | Sato et al. | |
| 5,873,244 | A | 2/1999 | Cobo et al. | |
| 6,173,573 | B1 * | 1/2001 | Kamada ................ | F15B 11/163 60/422 |
| 6,442,934 | B1 | 9/2002 | Okuda et al. | |
| 7,788,916 | B2 | 9/2010 | Brockman et al. | |
| 8,128,377 | B2 | 3/2012 | Earhart et al. | |
| 2004/0244659 | A1 | 12/2004 | Mayerle et al. | |
| 2005/0205272 | A1 | 9/2005 | Suzuki et al. | |
| 2008/0181793 | A1 | 7/2008 | Mistry et al. | |
| 2009/0229261 | A1 | 9/2009 | Lin et al. | |
| 2014/0060032 | A1 * | 3/2014 | Pfaff ..................... | F15B 11/165 60/422 |
| 2016/0144893 | A1 * | 5/2016 | Wiertellok ............ | F16H 61/421 60/327 |

FOREIGN PATENT DOCUMENTS

| | | | |
|---|---|---|---|
| EP | 2412948 | A1 | 2/2012 |
| WO | WO-2012125792 | A2 | 9/2012 |
| WO | WO-2015066182 | A1 | 5/2015 |

OTHER PUBLICATIONS

"International Application Serial No. PCT/US2014/062903, International Search Report dated Jan. 29, 2015", 2 pgs.

"International Application Serial No. PCT/US2014/062903, Written Opinion dated Jan. 29, 2015", 14 pgs.

* cited by examiner

HYDRAULIC DISPLACEMENT CONTROL SYSTEM

CLAIM OF PRIORITY

This patent application is a U.S. National Stage Filing under 35 U.S.C. 371 from International Application No. PCT/US2014/062903, filed Oct. 29, 2014, which claims the benefit of priority of U.S. Provisional Patent Application Ser. No. 61/896,944, filed on Oct. 29, 2013, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc.; Sioux Falls, S. Dak.; All Rights Reserved.

TECHNICAL FIELD

This document pertains generally, but not by way of limitation, to hydraulic systems.

BACKGROUND

Hydraulic systems are used in a variety of applications to power one or more loads (e.g., motors, pistons or the like) through the varied application of pressure and the varied delivery of hydraulic fluid (oil) flow. In one example, a hydraulic pump is provided in a prime mover, such as a tractor, and one or more loads are included in implements coupled with the prime mover (e.g., fans and coulters on a seeder). The loads are powered according to the hydraulic pump of the prime mover.

In some examples, hydraulic pistons (e.g., pistons used in articulating arms, coulters or the like) require relatively low amounts of hydraulic fluid flow but conversely require relatively high pressures to apply the desired amount of force through the piston. For instance a hydraulic piston used to apply down pressure for a coulter may require a hydraulic pressure nearing the maximum pressure for the hydraulic pump of a tractor to ensure the coulter provides a furrow for seeding to a desired depth. In other examples, hydraulic motors (e.g., with rotating shaft outputs) require relative low hydraulic pressure and conversely, high hydraulic fluid flow to ensure rotation of the shaft at the desired speed.

OVERVIEW

The present inventors have recognized, among other things, that a problem to be solved can include minimizing wasted hydraulic power between high pressure low flow loads and low pressure high flow loads. For instance, hydraulic motors coupled with fans generally use low hydraulic pressure and high hydraulic fluid flows. Conversely, hydraulic pistons (e.g., coupled with coulters on a seeder) require high pressures and low hydraulic fluid flow. Hydraulic systems (e.g., hydraulic pumps on a prime mover) are generally operated at high pressure and high flow to address a combination of hydraulic loads with these varied requirements. Operating the hydraulic system at a high pressure and a high flow rate requires a relatively large hydraulic system capable of addressing these needs and attendant conditioning of the hydraulic fluid (e.g., a large cooling system). However, because both of the hydraulic loads do not each need high pressure and high flow rates a significant portion of the hydraulic power developed by the hydraulic system is wasted. For instance in one example, fifty percent of the power generated by the hydraulic system is wasted. Additionally, generating such hydraulic power requires cooling of the fluid for operation of the hydraulic system.

Alternatively, dual hydraulic systems are installed in a prime mover to supply separate hydraulic fluids at the required pressure and flow combinations (e.g., one flow at high pressure and low flow, and another at low pressure and high flow). The inclusion of dual hydraulic systems adds expense and additional supporting equipment such as increased cooling, tubing, couplings and the like.

In an example, the present subject matter can provide a solution to this problem, such as by providing a control system using a variable displacement hydraulic motor in combination with a flow control valve (a load based pressure and flow controller). The variable displacement hydraulic motor is operated in a manner to minimize a pressure drop across the upstream flow control valve corresponding to a hydraulic system pressure ($P_S$) at the valve inlet and a hydraulic load inlet pressure ($P_L$ or motor inlet pressure) at the load inlet (and valve outlet). For example, the displacement of the variable displacement hydraulic motor is decreased based on the measured differential (e.g., between $P_L$ and $P_S$ or a specified system pressure) to thereby increase $P_L$. An increase in $P_L$ decreases the pressure drop across the flow control valve, and correspondingly ensures the variable displacement hydraulic motor operates at a higher pressure. The desired load characteristic of the hydraulic motor (e.g., the rpm of a motor output or output shaft coupled with a fan) is maintained according to the higher pressure and the flow control valve operation (e.g., at a lower flow rate). A high flow low pressure load, such as a fan coupled with a hydraulic motor, is thereby transformed into a high pressure low flow load (a transformed hydraulic load) configured to maintain a desired load characteristic, such as rotational speed.

The transformed hydraulic load in combination with another high pressure low flow load (e.g., hydraulic pistons applying down pressure to a coulter) requires a limited amount of hydraulic flow (a relatively low flow rate) and a high pressure. A hydraulic system accordingly need only supply hydraulic fluid at the high pressure and the low flow rate instead of otherwise providing hydraulic fluid at both high pressure and high flow rate. Inefficiencies, such as wasted power and extra cooling for the additional flow of hydraulic fluid, are thereby minimized. Further, in some examples, the hydraulic system including the hydraulic pump of a prime mover is specified for a lower flow rate according to the transformed hydraulic load having the lower flow requirements. Similarly, the cooling system for the hydraulic fluid is also scaled down according to the decreased flow rate.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Described herein are various configurations of devices and methods of a hydraulic system, such as a hydraulic displacement control system. The following examples and drawings illustrate the subject matter to enable those skilled in the art to practice the subject matter described in the following detailed description. Portions and features of some examples may be included in, or substituted for, those of other examples.

Figure 1:
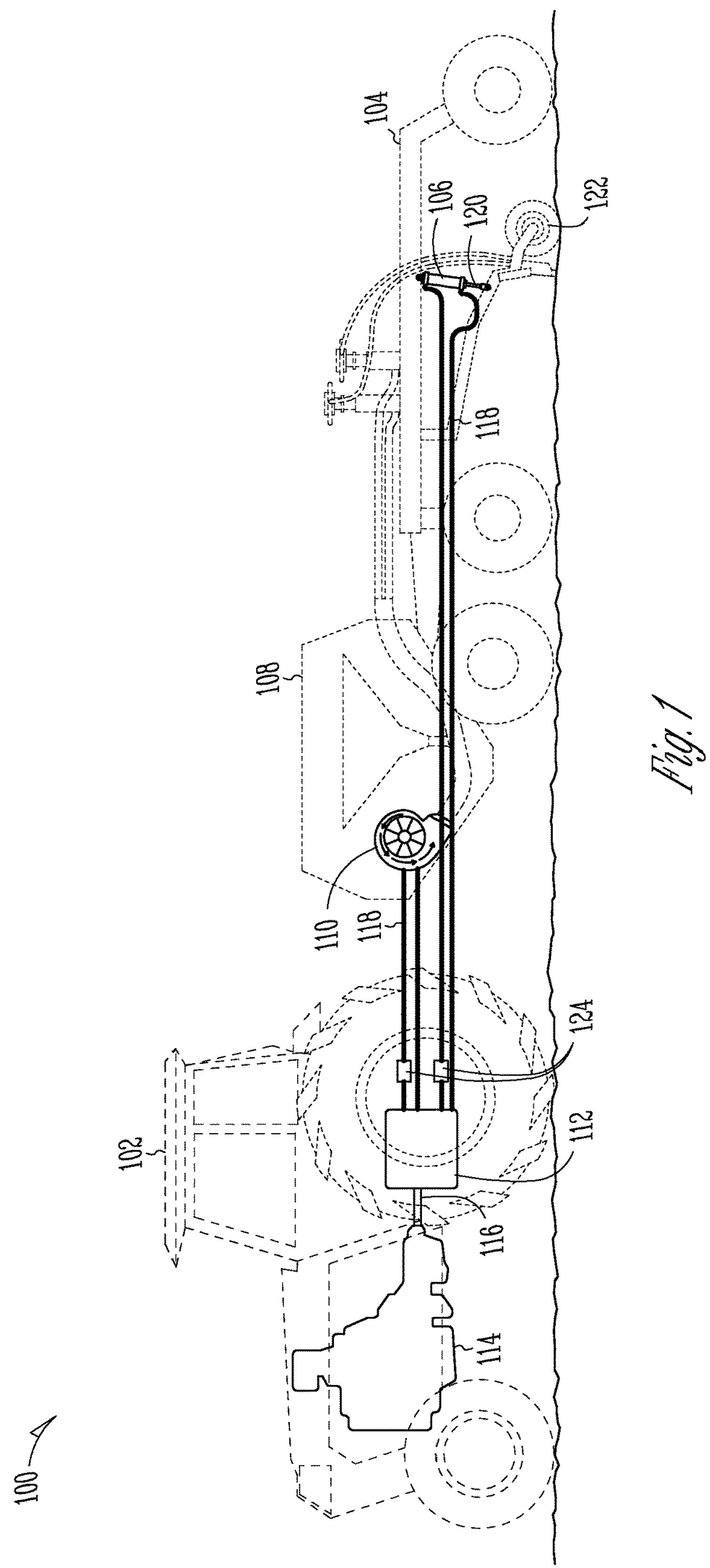
FIG. 1 is a side view of one example of a hydraulic system incorporated into an agricultural implement train including a prime mover, seed bin, and seeder.

FIG. 1 depicts a side view of a series of agricultural implements coupled to a prime mover 102 (e.g., an agricultural implement train 100). In the example shown, the prime mover 102 is a tractor with a first implement 104 (e.g., a seeder) coupled thereto. The first implement includes at least one hydraulic load, for instance a first hydraulic load 106 (e.g., a hydraulic cylinder coupled with a tool such as a coulter). In one example a second implement 108 (e.g., seed bin of an air seeder) is coupled to the prime mover 102 as shown in FIG. 1. The second implement includes at least one hydraulic load, for instance a second hydraulic load 110 (e.g., a hydraulic motor). In one example, each of the first hydraulic load 106 and second hydraulic load 110 include, but are not limited to, one or more of a hydraulic cylinder, hydraulic motor, or other hydraulic load.

The prime mover 102 includes a hydraulic pump 112. In one example, the hydraulic pump 112 is driven by an engine 114 of the prime mover 102. For instance, the engine 114 includes a power take off 116. The power take off 116 is coupled to a drive shaft of the pump 112, such that the drive shaft of the pump 112 is rotated by the engine 114. One or more hydraulic lines 118 (e.g., tubes, hose, pipes, or the like for transporting pressurized fluid) couple the hydraulic pump 112 to the first hydraulic load 106. At least one additional hydraulic line 118 couples the hydraulic pump 112 to the second load. The hydraulic pump 112 delivers hydraulic fluid under pressure to the at least one hydraulic load including for instance the first and second loads 106, 110. The hydraulic pump 112 delivers the hydraulic fluid at a hydraulic pressure and flow rate to the one or more hydraulic loads. The hydraulic pressure and flow rate of the hydraulic fluid are controlled by the characteristics of the hydraulic pump 112 (maximum and minimum pressures and flow rates, operator input, control modules or the like). For instance, in one example the operator of the prime mover 102 controls the hydraulic pump 112 (e.g., through manipulation of a transmission or clutch coupled between the engine 114 and the hydraulic pump 112).

As previously described, the first hydraulic load 106 is coupled to the first implement, such as the seeder 104. In the example of FIG. 1, the first hydraulic load 106 includes, but is not limited to, one or more coulter downforce cylinders each correspondingly coupled with a coulter 122. The coulter downforce cylinders (the first hydraulic load 106) each include a piston assembly 120. The piston assembly 120 is coupled to the coulter 122 and applies downforce to the coulter 122 according to the hydraulic fluid pressure delivered to the cylinder. That is to say, the delivery of hydraulic fluid at a hydraulic pressure to the first hydraulic load 106 translates the coulter 122 toward the ground. Correspondingly a portion of the coulter 122 is pressed into the soil to a desired depth based on the hydraulic pressure.

In one example, the second hydraulic load 110 includes, but is not limited to, a hydraulic motor (e.g., coupled to a seeder fan as shown in FIG. 1). The second hydraulic load 110 propels seed from the second implement, such as a seed bin, to the first implement (seeder 104). The second hydraulic load 110 is driven at a speed (revolutions per minute) or air pressure (at an outlet) to accordingly deliver seeds at a desired rate to the seeder 104.

Figure 2:
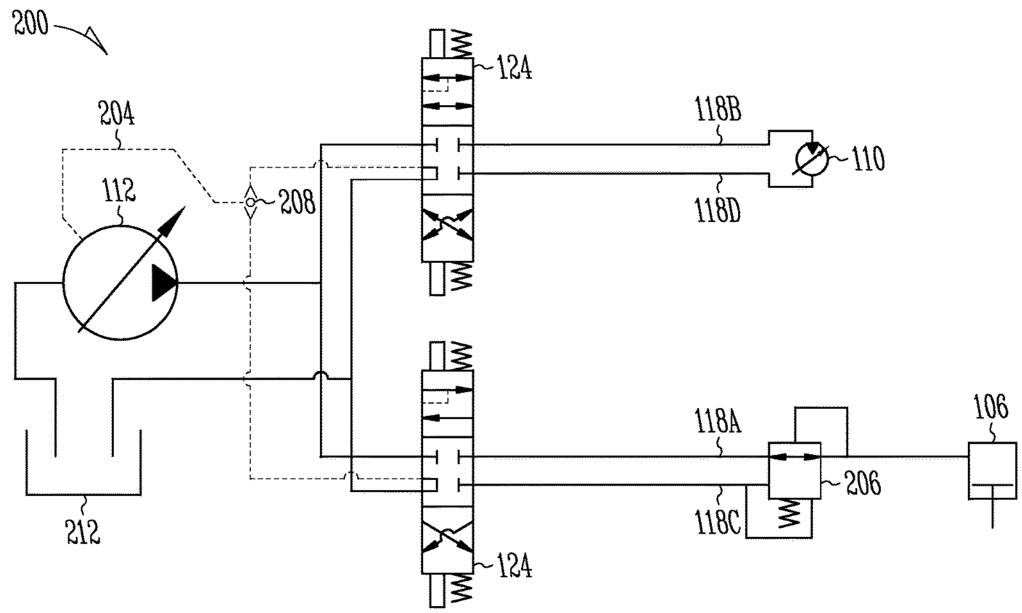
FIG. 2 is a hydraulic schematic of one example of a hydraulic system including a first and second loads.

As shown in the example of FIG. 1, directional control valves 124 are included along one or more hydraulic lines 118 (e.g., the first hydraulic supply line 118A or second hydraulic supply line 118B as shown in FIG. 2 and described herein). The directional control valves 124 include an open state, a closed state, and any partially open state therebetween. For instance, in the closed state, no hydraulic fluid flows through the directional control valves 124.

FIG. 2 is an exemplary schematic of a hydraulic system 200 including a first hydraulic load 106 and a second hydraulic load 110. The hydraulic system 200 has hydraulic components including, but not limited to the hydraulic pump 112, the first hydraulic load 106 (e.g., the coulter downforce cylinder), the second hydraulic load 110 (e.g., the hydraulic motor), one or more directional control valves 124, a pressure reducing valve 206, and a hydraulic fluid reservoir 212.

Hydraulic lines 118 are coupled between one or more hydraulic components. As shown in the example of FIG. 2, the hydraulic lines 118 include a first hydraulic supply line 118A and a first hydraulic return line 118C associated with the first hydraulic load 106. In the example shown in FIG. 2, the hydraulic lines further optionally include a second hydraulic supply line 118B and a second hydraulic return line 118D associated with the second hydraulic load 110. In one example, a first hydraulic supply line 118A provides communication between an outlet of the hydraulic pump 112 and an inlet of the first hydraulic load 106. The outlet of the first hydraulic load 106 is coupled to a first return line 118C. The first return line 118C transfers hydraulic fluid back to a hydraulic fluid reservoir 212.

The hydraulic pump 112 includes, but is not limited to, variable displacement pumps and fixed displacement pumps, or the like. The hydraulic pump 112 supplies pressure to the hydraulic system 200, for instance a pressure including, but not limited to, 500, 3,000, 7,000 pounds per square inch (PSI), or other pressures achieved with hydraulic pumps. The flow rate of the hydraulic pump 112 includes, but is not limited to 5, 30, 100 gallons per minute (GPM) of hydraulic fluid or other flow rates achieved with the hydraulic pumps. In one example, the displacement of the hydraulic pump 112 is variable and the volume of fluid displaced per revolution of the hydraulic pump 112 is adjustable (e.g., by operator control, computer control, or a combination thereof). For instance, the hydraulic pump 112 includes a swash plate and the angle of the swash plate is adjusted to correspondingly determine the displacement of the hydraulic pump 112. As previously mentioned, in one example, the hydraulic pump 112 is coupled to the engine 114 of the prime mover 102. The speed (e.g., RPM) of the hydraulic pump 112 is controlled by the speed of the power take off 116 of the engine 114 (and optionally a transmission or clutch is included between the engine 114).

A coulter downforce cylinder (e.g., the first hydraulic load 106 or second hydraulic load 110) includes a housing (e.g., coulter downforce cylinder barrel), piston assembly 120, and a port with at least one valve. The port includes, but is not limited to, an inlet port, outlet port, pressure relief, or the like. In one example, the coulter downforce cylinder includes an inlet port and an outlet port. In the example of FIG. 2, a hydraulic line 118, for instance the first hydraulic supply line 118A, is coupled to the inlet port. The return line, for instance the first return line 118C, is coupled to the outlet port. The coulter downforce cylinder includes, but is not limited to, a single acting, double acting, telescoping, double acting cylinder, or any combination thereof.

In one example, a second hydraulic supply line 118B couples the outlet of the hydraulic pump 112 and an inlet of the second hydraulic load 110 (e.g., hydraulic motor). The outlet of the second hydraulic load 110 is coupled to a second return line 118D. The second return line 118D transfers hydraulic fluid back to a hydraulic fluid reservoir 212 (shown in FIG. 2).

The hydraulic motor (e.g., the second hydraulic load 110 as shown in FIGS. 1 and 2) includes, but is not limited to, a gear motor, vane motor, gerotor motor, piston motor, or the like. Optionally, the hydraulic motor is coupled with another component, such as fan or blower as shown in FIG. 1, and the motor in combination with the fan comprise the second hydraulic load 110). In one example, the hydraulic motor is a variable displacement hydraulic motor as shown in FIG. 2. For instance, the displacement of the variable displacement hydraulic motor is adjustable such that the variable displacement hydraulic motor is configured to change (e.g., by an operator control, electronic control, computer control, or a combination thereof) the volume of fluid displaced per revolution. In one example, the hydraulic motor includes a swash plate, wherein the adjustable angle of the swash plate determines the displacement of the variable displacement hydraulic motor. The displacement of the hydraulic motor determines the speed of the hydraulic motor for a constant flow rate of hydraulic fluid that is delivered to the hydraulic motor. In one example, the hydraulic motor includes a motor output (e.g., output shaft) that is coupled to one or more tools, for instance a seeder fan. The seeder fan includes, but is not limited to, a centrifugal fan as shown in FIG. 1.

In the example of FIG. 2, directional control valves 124 are located along at least the first hydraulic supply line 118A, the second hydraulic supply line 118B, the first return line 118C, and the second return line 118D. The directional control valves 124 include at least one inlet port and at least one outlet port. In one example, the directional control valves 124 are provided in a composite housing including a plurality of inlet and outlet ports. The exemplary valves shown in FIG. 2 are four-port directional control valves 124 including a first inlet port, a second inlet port, a first outlet port, and a second outlet port. For instance, the outlet of the hydraulic pump 112 is coupled to a first inlet port of the directional control valve 124. A first outlet port of the directional control valve 124 is coupled to the inlet of the first hydraulic load 106. The outlet of the first hydraulic load 106 is coupled to the second inlet port (e.g., by way of the first return line 118C). The second outlet of the directional control valve 124 is coupled to the hydraulic reservoir 212 (e.g., by way of the first return line 118C). FIG. 2 also depicts in another example, directional control valves 124 along the second hydraulic supply line 118B and the second return line 118D. As shown in the example of FIG. 2, the directional control valves 124 include, but are not limited to, a solenoid control valve, a spring return valve, a crossover valve, or any combination thereof.

In one example, the hydraulic pump 212 is a load sensing pump. For instance, the hydraulic system 200 includes a pressure signal line 204. The pressure signal line communicates hydraulic fluid pressure to the hydraulic pump 212, such as the pressure differential across the directional control valves 124. For instance, in one example, a shuttle valve 208 is located between the hydraulic pump 212 and the directional control valves 124. The shuttle valve 208 directs hydraulic fluid from a single directional control valve 124 to the hydraulic pump 212, such as the directional control valve 124 having the highest pressure differential. The displacement of the hydraulic pump 212 is adjusted to maintain a constant pressure drop across the directional control valve 124. Accordingly, the flow rate of hydraulic fluid is maintained by the load sensing pump.

A pressure reducing valve 206 is included along the first hydraulic supply line 118A, in one example. For instance the pressure reducing valve 206 is located between the directional control valve 124 and the first hydraulic load 106. The pressure reducing valve 206 is coupled to the hydraulic fluid reservoir 212 (e.g., by the first return line 118C or second return line 118D). The pressure reducing valve 206 opens when exposed to a threshold hydraulic pressure. For instance, the pressure reducing valve 206 maintains the hydraulic fluid within the first hydraulic supply line 118A at a threshold pressure, including, but not limited to, a system pressure, a first load high pressure characteristic, or other. In one example, the pressure reducing valve 206 is a closed center valve (or other type of valve) that drains hydraulic fluid to the fluid reservoir 212 to maintain the threshold hydraulic pressure within the first hydraulic supply line 118A. In other words, the pressure reducing valve 206 maintains a high pressure and low flow rate of hydraulic fluid within the first hydraulic line 118A. One of ordinary skill in the art will recognize other configurations for maintaining a high pressure and low flow rate of hydraulic fluid along the first hydraulic supply line 118A. In another example, the pressure reducing valve 206 protects the hydraulic line 118, the first hydraulic load 106, the second hydraulic load 110, and other components of the hydraulic system 200 from damage otherwise caused with overpressure.

Figure 3:
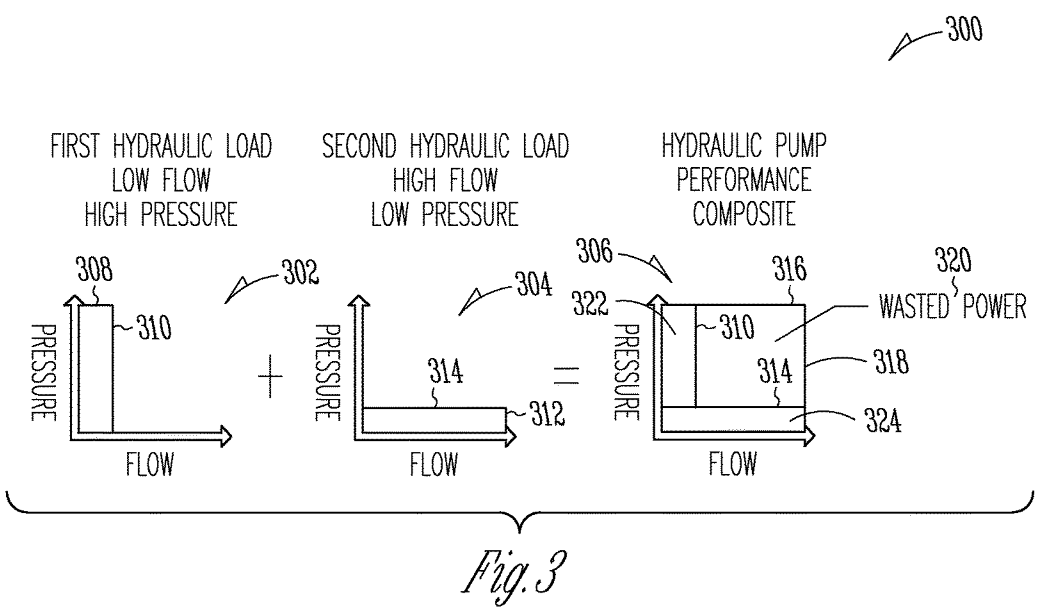
FIG. 3 is a diagram depicting one example of flow rate and pressure characteristics of a first and a second loads of the hydraulic system of FIG. 2 and a pump performance output to correspond to the system flow rate and pressure characteristics.

FIG. 3 is a diagram 300 illustrating one example of a first hydraulic load 106 flow rate and pressure demand 302 (e.g., a coulter downforce cylinder) and a second hydraulic load 110 flow rate and pressure demand 304 (e.g., a hydraulic motor). Also shown in FIG. 3 is a plot of hydraulic pump performance 306 required to meet the first and second flow rate and pressure demands 302, 304 of the first and second hydraulic loads 106, 110.

In the example shown, the first hydraulic load 106 includes a coulter downforce cylinder. The coulter downforce cylinder includes, but is not limited to, a piston assembly located within the sealed housing of the cylinder and at least one port. As previously described with respect to FIG. 2, the at least one port includes one or more valves. The flow of hydraulic fluid in or out of the cylinder is controlled by opening or closing the one or more valves in the inlet port or the outlet port of the cylinder.

In one example, a high pressure (e.g., 3,000 PSI) is applied to an extending side of the piston assembly. Hydraulic fluid entering the housing through the inlet port fills the housing of the coulter downforce cylinder on the extending side of the piston assembly 120. The high pressure of the hydraulic fluid translates the piston assembly 120 with respect to the housing, for instance to displace the piston assembly 120 toward extension. A low flow rate (e.g., mass flow rate or volumetric flow rate) is required to extend the piston assembly 120 of the coulter downforce cylinder because the volume of the housing on the extending side of the piston assembly 120 is fixed (e.g., constant) and relatively small compared to other components without a fixed volume (e.g., a rotating hydraulic motor). The pressure of the hydraulic fluid at the extending side of the piston assembly 120 is maintained at a threshold pressure by the pressure reducing valve 206. Stated another way, when the first hydraulic load is the coulter downforce cylinder or other low load component, the hydraulic pump produces a high pressure (e.g., high pressure characteristic 308) and delivers a low flow rate (e.g., low flow characteristic 310) of hydraulic fluid to the cylinder in order to operate the first hydraulic load 106.

As shown in the example of FIG. 2, the hydraulic system 200 includes the second hydraulic load 110. For instance, the second hydraulic load 110 includes the hydraulic motor. The hydraulic motor includes one or more pistons, gears, or turbines driven by the flow of pressurized hydraulic fluid through the hydraulic motor. In the example of a seeder fan, as previously discussed with respect to FIG. 1, the second hydraulic load 110 requires a high flow rate (e.g., high flow characteristic 312) and optionally operates at a low-torque. For instance, the second hydraulic load 110 only requires a low pressure (e.g., low pressure characteristic 314) to operate the hydraulic motor at a desired speed (e.g., RPM).

The hydraulic pump 112 is driven to a desired pressure (e.g., system pressure 316) and flow rate (e.g., system flow rate 318). In one example, the hydraulic system 200 includes a composite of the first hydraulic load 106 (having a first load high pressure characteristic 308 and a first load low flow characteristic 310) and a second load 110 (having a second load low pressure characteristic 314 and a second load high flow characteristic 312). The hydraulic pump 112 is driven at a high system pressure 316 and a high system flow rate 318 to meet the demands of the first and second hydraulic loads 106, 110. Stated another way, the hydraulic pump 112 is driven in a high power consumption state. The power input of the hydraulic pump 112 is calculated from the system pressure 316 (e.g., output pressure) of the hydraulic pump 112 multiplied by the system flow rate 318 (e.g., output of the hydraulic pump 112). In other words, the power input of the pump 112 is calculated from the composite of the high pressure and high flow rate of the first hydraulic load 106 and the second hydraulic load 110, respectively.

A large amount of wasted power 320 is generated when the hydraulic pump 112 is operated with a high system pressure 316 and a high system flow rate 318 (e.g., a large composite). For instance, the power required to separately operate the first hydraulic load (e.g., the first load power 322) in addition to the power required to operate the second hydraulic load (e.g., second load power 324) sums to less power than is generated by driving the hydraulic pump at a high system pressure 316 and a high system flow rate 318 with the single hydraulic pump 112. The difference between the power generated by the hydraulic pump 112 and the power required by the sum of the hydraulic loads included in the hydraulic system 200 is the wasted power 320.

Figure 4:
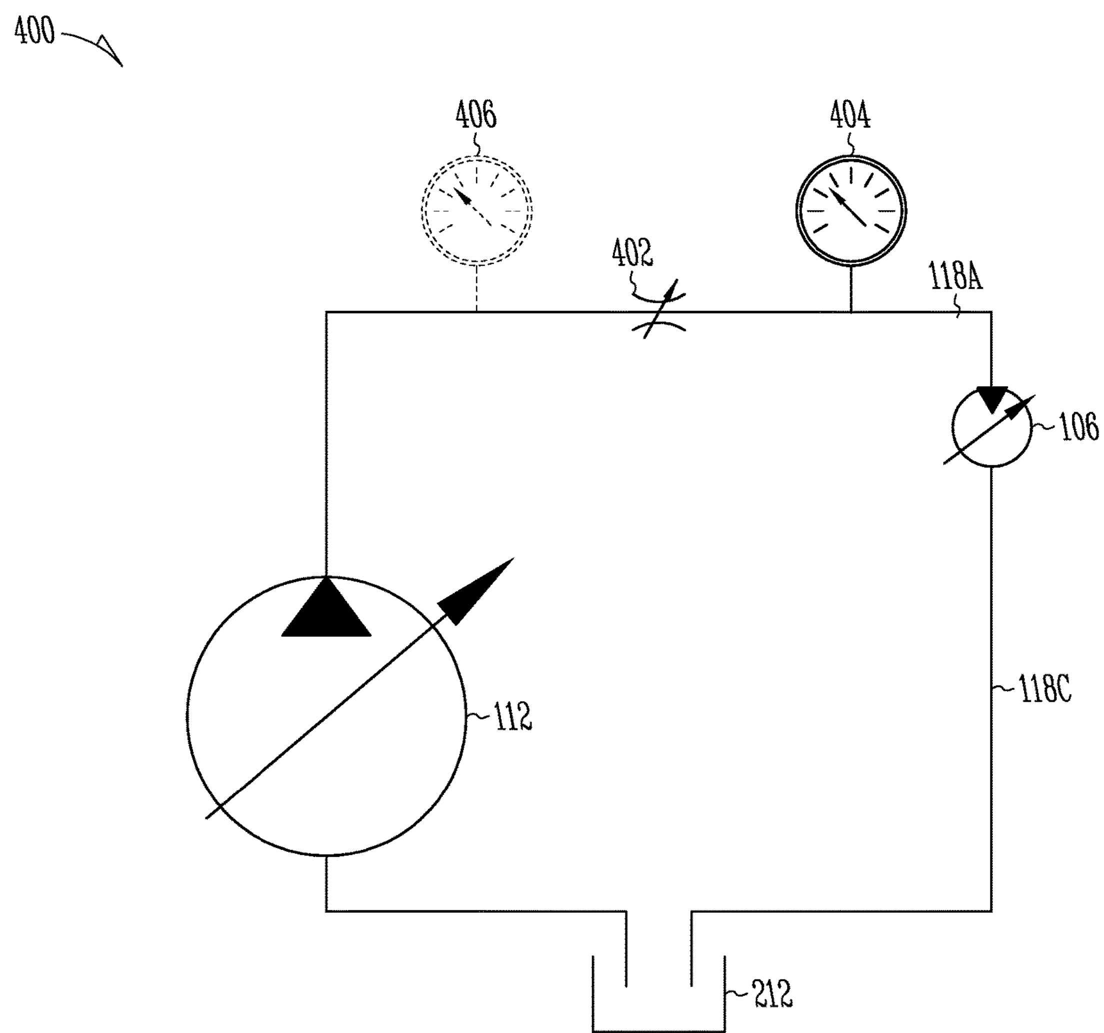
FIG. 4 is a hydraulic schematic of one example of a hydraulic system including a flow control valve and at least one motor inlet pressure sensor.

FIG. 4 is an exemplary schematic of a hydraulic system 400 including, but not limited to, a hydraulic pump 112, a first load 106 (hydraulic motor), and a hydraulic fluid reservoir 212 (e.g., a sump) as described in previous examples. The exemplary hydraulic system 400 further includes a flow control valve 402 (located between the first hydraulic load 106 and the hydraulic pump 112), and a motor inlet pressure sensor 404 located between the flow control valve 402 and the first hydraulic load 106. In one example, the hydraulic system 400 includes an optional system pressure sensor 406. Alternatively, the system pressure is a known quantity, for instance where the hydraulic pump 112 is operated at a steady and known flow rate and pressure.

A hydraulic line 118, for instance the first hydraulic supply line 118A, provides communication (transmits hydraulic fluid) between the outlet of the hydraulic pump 112 and the flow control valve 402. The first hydraulic supply line 118A further transmits hydraulic fluid from the flow control valve 402 to the inlet of the first hydraulic load 106 The first return line 118C provides communication (transmits hydraulic fluid) between the outlet of the first hydraulic load 106 and the fluid reservoir 212.

As shown in the example of FIG. 4, the first hydraulic load 106 includes a variable displacement hydraulic motor. In one example, the variable displacement hydraulic motor includes a motor output (such as a shaft) coupled to a fan, for instance a seeder fan. The seeder fan includes, but is not limited to, a centrifugal fan as shown in FIG. 1. As previously described with regard to FIG. 2, the variable displacement hydraulic motor includes, but is not limited to, a gear motor, vane motor, gerotor motor, piston motor, or the like. The variable displacement hydraulic motor is adjusted (e.g., by an operator control, computer control, or a combination thereof) to change the displacement (volume of fluid displaced per revolution of the hydraulic motor) of the variable displacement hydraulic motor. In one example, the hydraulic motor includes a swash plate, and the angle of the swash plate is adjustable and determines the displacement of the variable displacement hydraulic motor (part of the first hydraulic load 106).

In one example, with a constant flow rate of hydraulic fluid delivered to the hydraulic motor, the displacement of the hydraulic motor determines the speed of the hydraulic motor. To increase the speed of the variable displacement hydraulic motor, the displacement of the variable displacement hydraulic motor is decreased.

In another example, the speed of the variable displacement hydraulic motor remains constant. For instance, the displacement of the variable displacement motor is changed to maintain a desired speed of the variable displacement hydraulic motor with a changing (high, low or in between) flow rate from the hydraulic pump 112. For a high flow rate of hydraulic fluid delivered to the variable displacement hydraulic motor, the displacement of the variable displacement hydraulic motor is high to maintain the desired speed of the variable displacement hydraulic motor. For a low flow rate of hydraulic fluid delivered to the variable displacement hydraulic motor, the displacement of the variable displacement hydraulic motor is low to maintain the desired speed of the variable displacement hydraulic motor.

The flow control valve 402 reduces the flow rate of hydraulic fluid delivered to the first hydraulic load 106 (the variable displacement hydraulic motor in the example of FIG. 4). The flow control valve 402 includes, but is not limited to, a needle valve, diaphragm valve, globe valve, or the like. The flow control valve 402 is adjustable. For instance, the flow rate of hydraulic fluid through the flow control valve 402 is changed by one or more of a proportional pulse width modulation solenoid, servo valve (+/− type output), or the like, coupled with the flow control valve 402. A flow rate of hydraulic fluid through the flow control valve 402 is dependent on the difference in pressure (pressure differential) between the inlet side of the valve (e.g., system pressure) and the outlet side of the valve (e.g., motor inlet pressure). A high pressure differential (e.g., 250, 500, 1000 PSI) results in a high flow rate (e.g., 15 or 30 GPM) of hydraulic fluid through the flow control valve 402. Accordingly, a low pressure differential (e.g., 10, 25, 50 PSI) results in a low flow rate (e.g., 1, 2, or 5 GPM) of hydraulic fluid through the flow control valve 402.

In one example, the flow rate and pressure of the hydraulic fluid delivered from the hydraulic pump 112 to at least the flow control valve 402 is constant. The displacement of the variable displacement hydraulic motor (first hydraulic load 106) is adjustable and reduced to a low displacement in the example. Because of the low displacement adjustment at the hydraulic motor, the pressure between the flow control valve 402 and the inlet of the variable displacement hydraulic motor is increased (e.g., by back pressure). As a result of the reduced pressure differential between the inlet side and the outlet side of the flow control valve 402, the flow rate of hydraulic fluid through the flow control valve is reduced, and accordingly the flow rate to the variable displacement hydraulic motor of the first hydraulic load 106 is also reduced. The speed of the variable displacement hydraulic motor is controlled by increasing or decreasing the flow rate of hydraulic fluid through the flow control valve 402. For instance, the speed of the variable displacement hydraulic motor is increased by increasing flow (e.g., opening the valve) through the flow control valve 402. Alternatively, the speed of the variable displacement motor is decreased by reducing (e.g., closing the valve) the flow through the flow control valve 402. Because the displacement of the variable displacement hydraulic motor is decreased the first hydraulic load operates at a lower flow and higher pressure (as discussed above). According to this example, the flow characteristic of the first hydraulic load 106 is thereby transformed from low pressure and high flow characteristics to first load 106 high pressure and low flow characteristics.

In one example, the pressure differential is approximated. For instance, the system pressure is approximated based on the hydraulic pump 112 characteristics and operating conditions (e.g., it is a known value based on the operating parameters of the hydraulic pump 112). The motor inlet pressure is measured by the motor inlet pressure sensor 404. The motor inlet pressure sensor 404 measures the pressure of the hydraulic fluid in communication between the flow control valve 402 and the first hydraulic load 106. The pressure differential is calculated from the difference of the system pressure and the motor inlet pressure.

As shown in the example of FIG. 4, the hydraulic system 400 includes an optional system pressure sensor 406. The system pressure sensor measures the pressure of the hydraulic fluid between the hydraulic pump 112 and the flow control valve 402. The inclusion of the system pressure sensor 406 allows measurement of the pressure differential with instant measured values of system pressure rather than approximated values of the system pressure. For instance, the pressure differential is the difference between the measured system pressure (from the system pressure sensor 406) and the measured motor inlet pressure (from the motor inlet pressure sensor 404).

The motor inlet pressure sensor 404 and the system pressure sensor 406 each include, but are not limited to, piezoelectric sensors, electromagnetic sensors, piezoresistive sensors, diaphragm based pressure sensors, capacitive sensors, optical sensors, potentiometric sensors, or the like. The inlet pressure sensor 404 and system pressure sensor 406 are each configured to measure one or more of gage, absolute, differential, vacuum, or other pressure.

Figure 5:
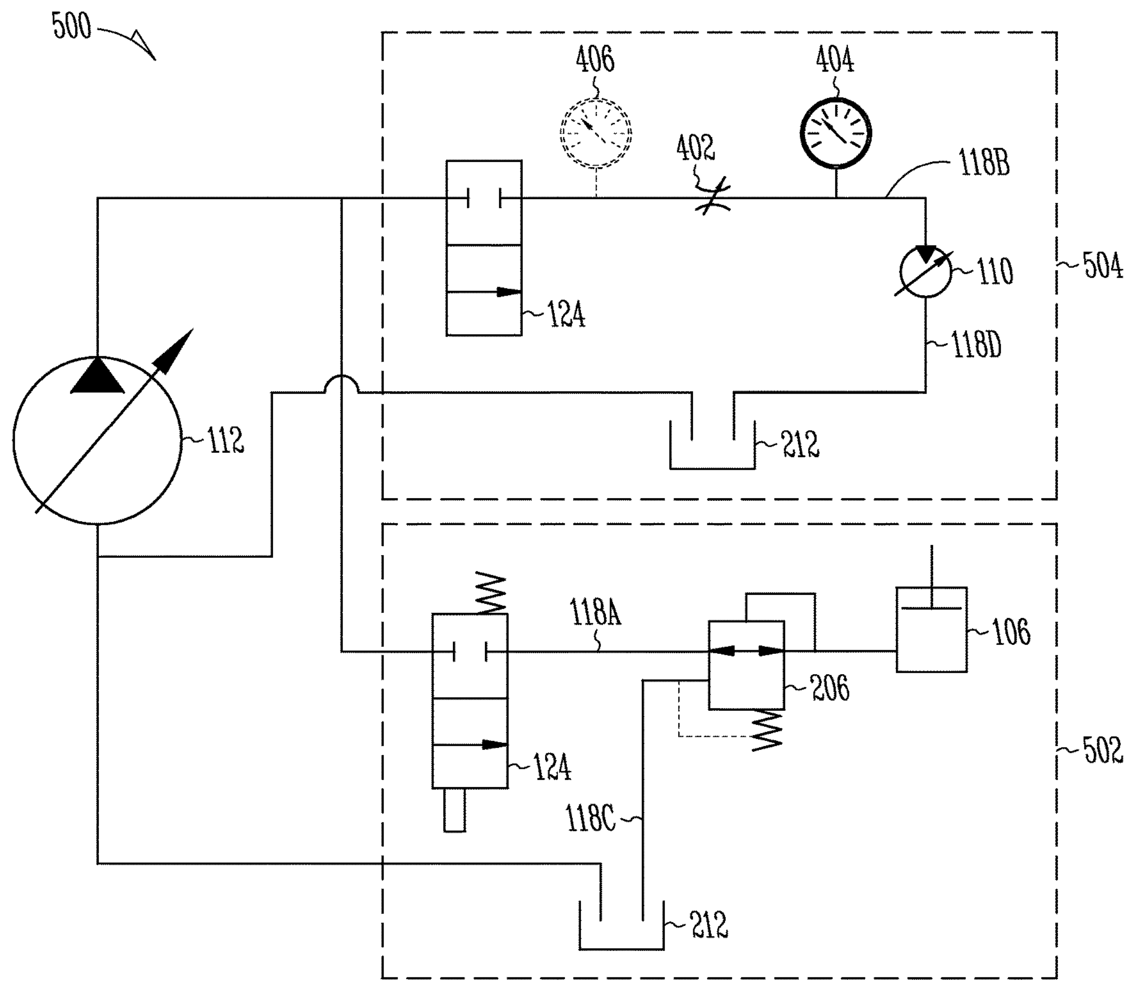
FIG. 5 is a hydraulic schematic of one example of a hydraulic system including two or more loads and a flow control valve as well as a motor inlet pressure sensor.

FIG. 5 shows an exemplary schematic of a hydraulic system 500 including at least a first hydraulic circuit 502 and a second hydraulic circuit 504, each including the hydraulic pump 112. The first hydraulic circuit 502 includes, but is not limited to, the first load 106 (e.g., a coulter downforce cylinder), the pressure reducing valve 206, at least one directional control valve 124 (e.g., a two-port directional control valve as shown in FIG. 5), and the hydraulic fluid reservoir 212 as described in previous examples.

The second hydraulic circuit 504 includes, but is not limited to, the second load 110 (e.g., a variable displacement hydraulic motor), the flow control valve 402 (located between the second hydraulic load 110 and the hydraulic pump 112), the motor inlet pressure sensor 404 (located between the flow control valve 402 and the second hydraulic load 110), at least one directional control valve 124 (e.g., a two-port directional control valve as shown in FIG. 5), and the hydraulic fluid reservoir 212 as described in previous examples. In one example, the hydraulic system 500 includes an optional system pressure sensor 406. The optional system pressure sensor 406 is located upstream of the directional control valves 124. The system pressure sensor 406 is optionally located in the second hydraulic circuit 504.

Referring to the first hydraulic circuit 502, the first hydraulic supply line 118A communicates hydraulic fluid from the hydraulic pump 112 to the first load 106. In one example, the directional control valve 124 is located along the first hydraulic supply line 118A between the hydraulic pump 112 and the first hydraulic load 106. The directional control valve 124 includes an open state and a closed stated. In the open state, hydraulic fluid flows from the hydraulic pump 112 to the first hydraulic load 106. In the closed state, no hydraulic fluid flows through the directional control valve 124 and correspondingly no hydraulic fluid flows from the hydraulic pump 112 to the first hydraulic load 106. The pressure reducing valve 206 is located along the first hydraulic supply line 118A. The pressure reducing valve 206 opens to direct hydraulic fluid to the fluid reservoir 212, such as when the pressure of the hydraulic fluid within the first hydraulic supply line 118A exceeds a threshold value.

Referring now to the second hydraulic circuit 504, including the second hydraulic load 110, the second hydraulic supply line 118B communicates hydraulic fluid from the hydraulic pump 112 to the second hydraulic load 110. In one example, directional control valves 124 are located on each of the first and second hydraulic supply lines 118A, 118B. The flow control valve 402 of the second hydraulic circuit 504 adjustably changes the flow of hydraulic fluid to the second hydraulic load 110. The motor inlet pressure sensor 404 is configured to measure the pressure of hydraulic fluid delivered to the second hydraulic load 110. In one example, the second hydraulic supply line 118B includes an optional system pressure sensor 406, located between the directional control valve 124 and the flow control valve 402. As previously discuss with regard to FIG. 4, the system pressure sensor 406 measures the pressure of the hydraulic fluid entering the flow control valve 402. The second return line 118D communicates hydraulic fluid from the outlet of the second hydraulic load 110 to the fluid reservoir 212.

As shown in the example of FIG. 5, the first hydraulic load 106 includes a hydraulic cylinder, such as a coulter downforce cylinder as previously described with respect to FIG. 1. The second hydraulic load 110 includes a variable displacement hydraulic motor. In one example, the variable displacement hydraulic motor includes the motor output (e.g., output shaft) coupled with a tool. In one example, the motor output is coupled to a fan, for instance a seeder fan. As discussed herein, in an example a hydraulic cylinder is a high pressure and low flow load, and a fan and motor combination are a low pressure and high flow load. In other words, the first hydraulic load 106 has a low flow and high pressure characteristic and the second hydraulic load 110 has a high flow and low pressure characteristic.

As previously described with regard to the example of FIG. 4, the flow control valve 402 shown in FIG. 5 adjusts (e.g., reduces) the flow rate of hydraulic fluid delivered to the second hydraulic load 110 (the variable displacement hydraulic motor). In one example, the flow rate and pressure of the hydraulic fluid delivered from the hydraulic pump 112 is constant (and accordingly known). The displacement of the variable displacement hydraulic motor (second hydraulic load 110) is reduced to a low displacement to generate a back pressure (upstream of the second hydraulic load 110) in the second hydraulic circuit 504 where the back pressure of the system 500 is closer to the system pressure provided by the hydraulic pump 112. Correspondingly, the pressure between the flow control valve 402 and the inlet of the variable displacement hydraulic motor is increased. As a result of the reduced pressure differential between the inlet side and the outlet side of the flow control valve 402, the flow rate of hydraulic fluid through the flow control valve (and to the second hydraulic load 110) is reduced. The speed of the variable displacement hydraulic motor of the second hydraulic load 110 is controlled by increasing or decreasing the flow rate of hydraulic fluid through the flow control valve 402. For instance, the speed of the variable displacement hydraulic motor is increased by increasing flow (e.g., opening the valve) through the flow control valve 402. Alternatively, the speed of the variable displacement motor is decreased by reducing (e.g., closing the valve) the flow through the flow control valve 402. According to this example, by adjusting the displacement of the motor and correspondingly raising the operative pressure of the second hydraulic load 110 while decreasing its overall flow requirement the characteristics of the second hydraulic load 110 are transformed from low pressure and high flow to second load 110 high pressure and low flow characteristics. The second hydraulic load 110 thereby more closely matches the requirements for operation of the first hydraulic load 106 (e.g., each include low flow and high pressure characteristics) with reduced displacement of the variable displacement hydraulic motor and decreased flow through the flow control valve 402 to the variable displacement hydraulic motor.

Figure 6:
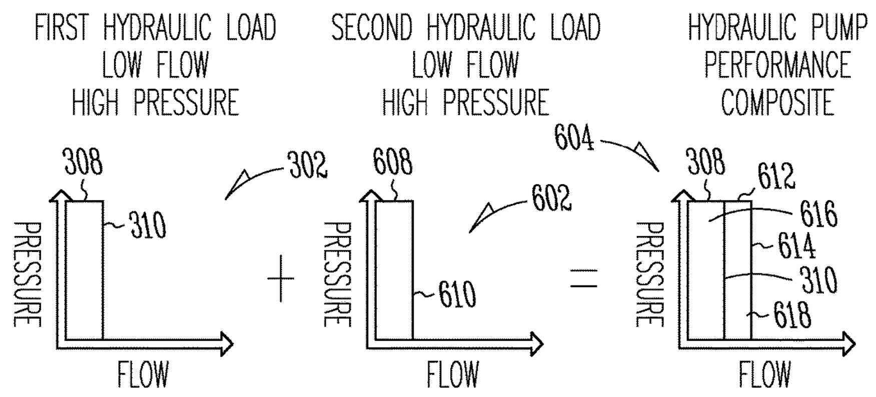
FIG. 6 is a diagram depicting one example of the flow rate and pressure characteristics of the first and second loads of the hydraulic system of FIG. 5 and a required pump performance output to correspond with the system flow rate and pressure characteristics.

FIG. 6 are a series of plots illustrating the example of FIG. 5 showing plots of both a first hydraulic flow rate and pressure demand 302 (e.g., of a coulter downforce cylinder) and a second hydraulic load flow rate and pressure demand 602 (e.g., of a hydraulic motor). The overall hydraulic pump performance 604 to meet the first and second flow rate and pressure demands 302, 602 is also shown in the third plot.

As shown in FIG. 6, the first hydraulic load 106 is in the example a coulter downforce cylinder. The hydraulic pump produces a first load high pressure (e.g., high pressure characteristic 308) and delivers a first load low flow rate (e.g., low flow characteristic 310) of hydraulic fluid to the cylinder to operate the first hydraulic load 106.

As previously discussed, the hydraulic system 500 includes a second hydraulic load 110. For instance, in one example, the second hydraulic load 110 includes the variable displacement hydraulic motor. The second hydraulic load 110 requires an initial second load high flow characteristic (e.g., high flow rate) and an initial second load low pressure characteristic (e.g., low pressure). As discussed herein, the displacement of the variable displacement hydraulic motor is changed (e.g., reduced) to transform the initial second load high flow characteristic and the initial second load low pressure characteristic to a final second load low flow characteristic 610 (e.g., low flow rate) and a final second load high pressure characteristic 608 (e.g., high pressure). Stated another way, the transformed second hydraulic load 110 requires a low flow rate and high pressure of hydraulic fluid supply (similar to the first hydraulic load 106) to operate the variable displacement hydraulic motor at a desired speed. In one example, the first load high pressure characteristic matches the second load high pressure characteristic (e.g., matches or more closely approaches the first load high pressure characteristic than at the initial state).

The hydraulic pump 112 is driven to a required pressure (e.g., system pressure 612) and a required flow rate (e.g., system flow rate 614). In one example, the hydraulic system 500 includes a composite of the first hydraulic load 106 (having a first load high pressure characteristic 308 and a first load low flow characteristic 310) and a second hydraulic load 110 (having a transformed second load high pressure characteristic 608 and a second load low flow characteristic 610). The hydraulic pump 112 is driven at a high system pressure 612 and a lower system flow rate 614 (e.g., lower than the system flow rate 318 previously shown in FIG. 3 and discussed herein) to meet the demands of both of the first and second hydraulic loads 106, 110. For instance, the hydraulic pump 112 is driven at a lower power consumption state (e.g., lower than the power consumption state of the example of FIG. 3). The power input of the hydraulic pump 112 is calculated from the system pressure 612 (e.g., output pressure) of the hydraulic pump 112 multiplied by the system flow rate 614 (e.g., output of the hydraulic pump 112). In other words, the power input of the pump 112 is calculated from the composite of the flow rates (total flow) and pressures (highest pressure) of the first hydraulic load 106 and the second hydraulic load 110. The power consumption shown in FIG. 6 is clearly lower than that shown in FIG. 3 even though both systems include first and second hydraulic loads 106, 110.

Wasted power is reduced when the hydraulic pump 112 is operated with a high system pressure 612 and a low system flow rate 614 (e.g., reduced composite compared to the example of FIG. 3). For instance, the power required to operate the first hydraulic load (e.g., the first load power 616) in addition to the power required to operate the second hydraulic load (e.g., second load power 618) sums to less power than is generated by driving the hydraulic pump at a high system pressure and a high system flow rate (as shown in FIG. 3). The wasted power is the difference between the power generated by the hydraulic pump 112 and the power required by the sum of the hydraulic loads included in the hydraulic system 600. As shown in FIG. 6, wasted power has been eliminated relative to the wasted power shown in FIG. 3 (e.g., minimized or entirely eliminated).

Figure 7:
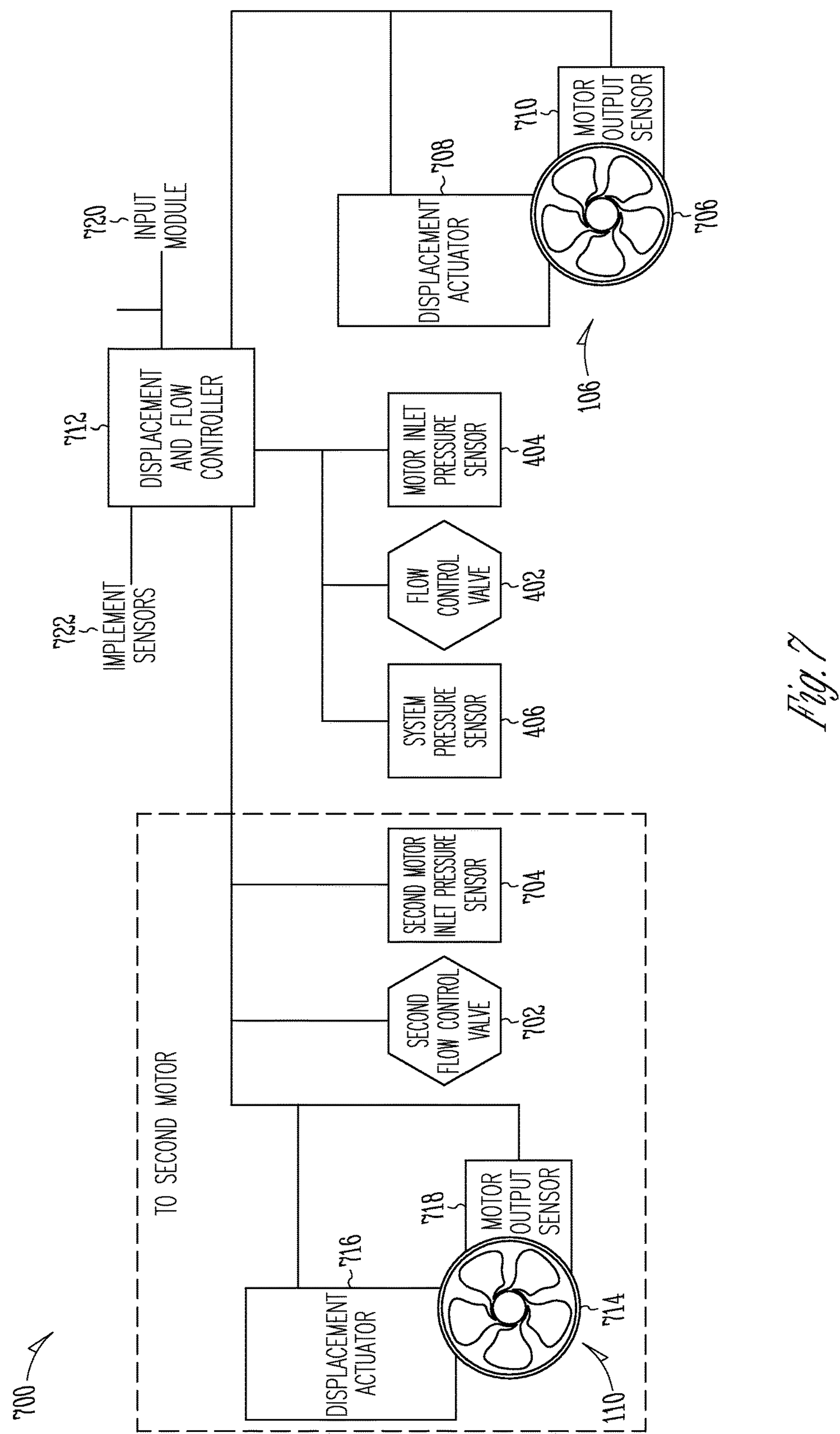
FIG. 7 is an electrical block diagram of one example of a hydraulic system including a first and second loads, a flow control valve, at least one pressure sensor, and a flow and displacement controller.

FIG. 7 is a block diagram of one example of a control system 700 including a displacement and flow controller 712. The control system 700 includes, but is not limited to, interfaces (sensors, actuators or the like) or with components including the first hydraulic load 106, the flow control valve 402, the motor inlet pressure sensor 404, and the system pressure sensor 406, each in communication directly or indirectly with the flow controller 712. In one example, the system 700 includes as an option interfaces with or components including the second hydraulic load 110, a second flow control valve 702, and a second motor inlet pressure sensor 704, each in communication directly or indirectly with the displacement and flow controller 712.

As discussed previously herein, the first hydraulic load 106 includes a variable displacement hydraulic motor in one example. The variable displacement hydraulic motor is coupled with one or more of, a motor fan 706, a displacement actuator 708 (e.g., a valve and potentiometer), and a motor output sensor 710 (e.g., speed sensor, fan speed sensor, flow sensor indexed to rotation speed based on a measured position of a swash plate or the like). In one example, the second hydraulic load 110 includes a second variable displacement hydraulic motor similar in at least some regards to the first variable displacement hydraulic motor. For instance, the first hydraulic load 106 includes a variable displacement hydraulic motor and the second hydraulic load 110 includes a variable displacement hydraulic motor. In another example, the first hydraulic load 106 and the second hydraulic load 110 each include at least a variable displacement hydraulic motor and one or more additional hydraulic loads (e.g., coulter downforce cylinders or additional variable displacement hydraulic motors). As previously described in regard to the variable displacement hydraulic motor, the second variable displacement hydraulic motor is coupled with one or more of a motor fan 714 (e.g. seeder fan), a displacement actuator 716 (e.g., a valve and potentiometer), and a motor output sensor 718 (e.g., speed sensor, fan speed sensor, flow sensor indexed to rotation speed based on a measured position of a swash plate or the like). In another example, the second variable displacement hydraulic motor is coupled with another type of hydraulic load including, but not limited to, hydraulic cylinders or the like.

In one example, the displacement actuators 708, 716 each include, but are not limited to, hydraulic cylinders, spindles (e.g., screws coupled to an electric motor that rotates the screw to produce mechanical translation of the spindle), or electrical solenoid pistons that tilt a swash plate of the variable displacement hydraulic motors. For instance, the displacement of the variable displacement hydraulic motors is changed by one or more of the displacement actuators 708, 716.

The motor output sensor 710 (and optionally the second motor output sensor 718) measure the rotational speed of the variable displacement hydraulic motor. In one example, the motor output sensor 710 includes, but is not limited to, a rotary encoder, Hall Effect sensor, or the like configured to measure the rotational speed (e.g., RPM) of the motor output of the variable displacement hydraulic motor. The motor output of the variable displacement hydraulic motor is coupled to the fan 706 (or optionally fan 714 of the second variable displacement hydraulic motor). In one example, air pressure at the output or inlet of the fan 714 is measured by the motor output sensor 710. The air pressure measurement corresponds to the rotational speed of the variable displacement hydraulic motor.

In the example shown in FIG. 7, the displacement and flow controller 712 is communicatively coupled to an input module. For instance, the input module includes, but is not limited to a switch, level, button, key pad, computer interface, or other operator input device configured to change the parameters of the hydraulic system 700. The parameters include, but are not limited to, one or more of a target fan speed (e.g., the rotational speed of the motor output or output shaft of the variable displacement hydraulic motor), a target pressure (e.g., the motor inlet pressure), or other parameter of the hydraulic system 700. In one example, the displacement and flow controller 712 is (optionally) electronically and communicatively coupled to at least one or more implement sensors 722, such as a bin pressure sensor, a bin velocity sensor, or the like.

Figure 8:
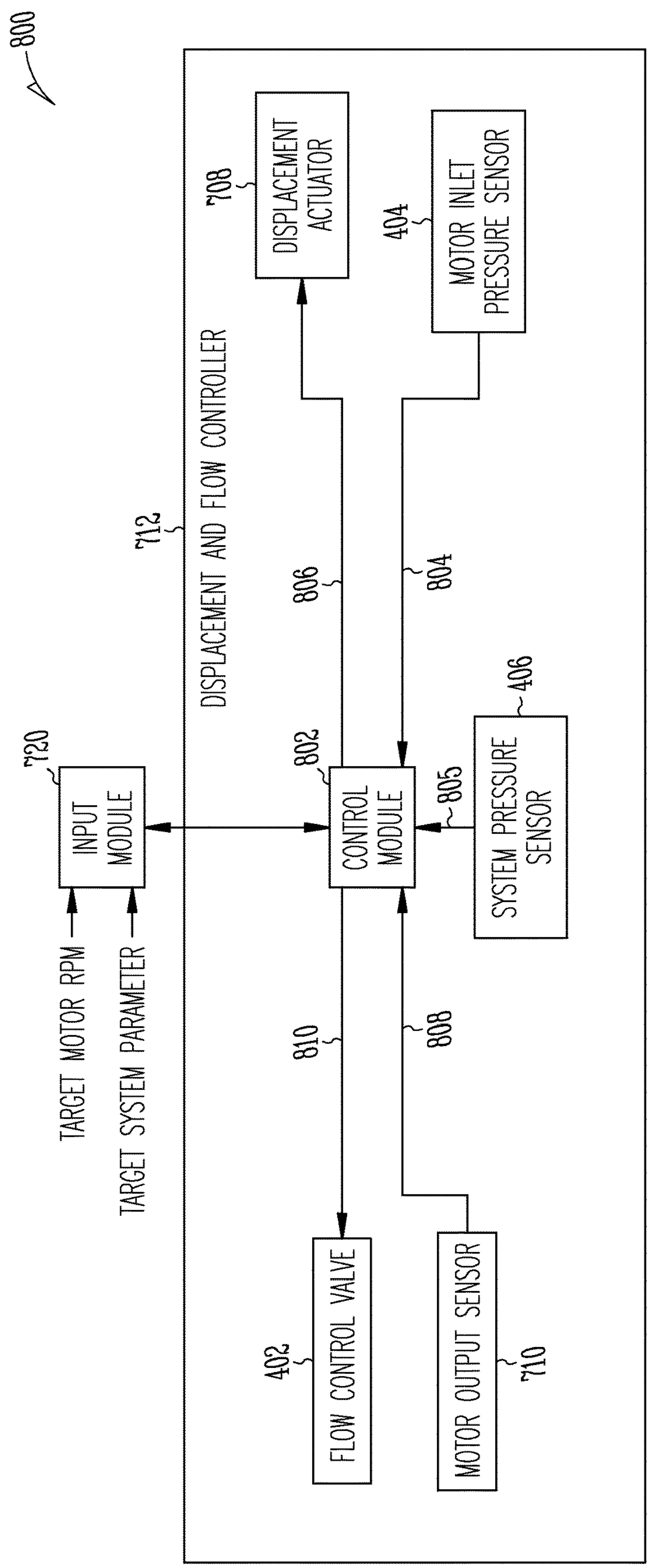
FIG. 8 is a block diagram of one example of a flow and displacement controller.
Figure 9:
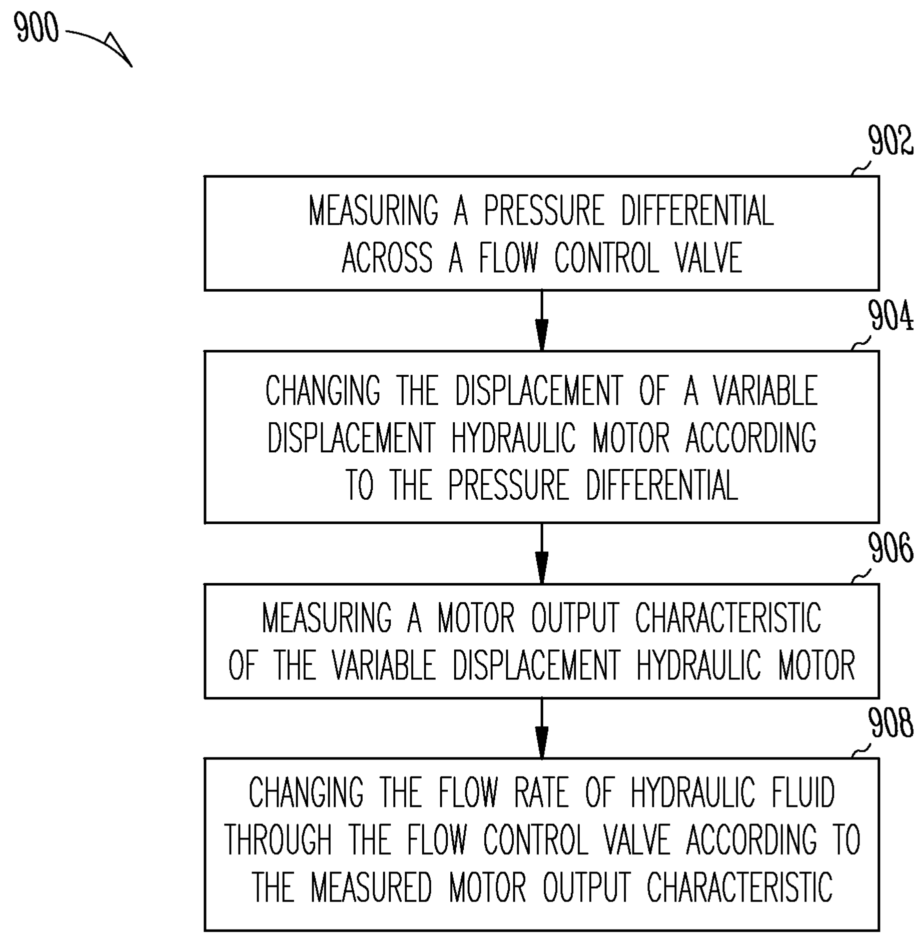
FIG. 9 is a block diagram of a method of operating a hydraulic system including a variable displacement motor, a motor inlet pressure sensor, and a flow control valve.

FIG. 8 is an exemplary block diagram 800 of the displacement and flow controller 712, including the input module 720. The displacement and flow controller 712 (as previously discussed with respect to FIG. 7) is coupled with a plurality of features of the hydraulic systems discussed herein and accordingly controls one or more features of the hydraulic systems including, but not limited to, flow control valve position (and flow rate), variable hydraulic motor displacement and the like. As shown in FIG. 8, the displacement and flow controller 712 includes a control module 802. The control module 802 is in communication with the input module 720 (also previously discussed in the example, of FIG. 7). The input module is 720 receives input from an operator, such as an operator of the prime mover 102 (see FIG. 1). For instance, operator input includes, but is not limited to, a target fan speed (rotational speed of the motor output or output shaft of the variable displacement hydraulic motor, or a volumetric flow rate associated with a corresponding speed), target system parameter (e.g., the desired pressure at the motor inlet pressure sensor 404, pressure at the system pressure sensor 406, or flow rate of hydraulic fluid), or the like. The control module 802 receives the input from the input module 720 including one or more of the target fan speed, target system parameter, or other input.

The control module 802 receives the measured motor inlet pressure (e.g., the pressure of hydraulic fluid as it enters the inlet of the variable displacement hydraulic motor). In one example, the control module 802 determines a pressure differential. For instance, the control module 802 receives a pressure transmission 804, 805 from the motor inlet pressure sensor 404 and the system pressure sensor 406. The pressure transmissions 804, 805 include, but are not limited to, signals corresponding to pressures measured (e.g., gage pressure or absolute pressure) within the hydraulic lines 118. The control module 802 calculates the pressure differential across the flow control valve 402 by the difference in the pressure transmission 805 of the system pressure sensor 406 and the pressure transmission 804 of the motor inlet pressure sensor 404. In another example, the control module 802 receives a combined pressure transmission 804 (corresponding to the pressure differential) from the pressure transmission 804 of the system pressure sensor 406 and the pressure transmission 804 of the motor inlet pressure sensor 404. For instance an intermediate module is provided between the control module 402 and the sensors 404, 406 to determine the differential. Optionally, the sensors communicate with each other and include a differential module to determine the pressure differential.

The control module 802 transmits a motor displacement control signal 806 to the displacement actuator 708 (or optionally the displacement actuator 716). The motor displacement control signal 806 is used by the displacement actuator 708 to increase or decrease the displacement of the variable displacement hydraulic motor. For instance, the displacement actuator pivots the swash plate of the variable displacement hydraulic motor according to the displacement control signal 806 of the control module 802. In one example, the control module 802 transmits a motor displacement control signal to decrease the displacement of the variable displacement hydraulic motor as described in the examples shown in FIGS. 4-6 (e.g., to transform low pressure high flow loads to high pressure low flow loads).

In one example, the control module 802 receives a motor output sensor transmission 808 from a motor output sensor 710 coupled with a motor output (e.g., a rotating shaft). The motor output sensor 710 communicates a motor output characteristic, such as a signal corresponding to the rotational speed of the motor output (optionally coupled to the seeder fan) of the variable displacement hydraulic motor. In one example, the control module 802 determines the speed of the motor output of the variable displacement hydraulic motor based on the motor output sensor transmission 808 from the motor output sensor 710. In another example, the motor output characteristic measured with the motor output sensor 710 includes, but is not limited to, a flow rate of hydraulic fluid delivered to the motor inlet (e.g., gallons per minute), a pressure of hydraulic fluid at the motor inlet, a ground speed of the implement, or the other output characteristic.

The control module 802 transmits a flow control signal 810 to the flow control valve 402. The flow control valve 402 receives the flow control signal 810 and adjusts the flow rate of hydraulic fluid through the flow control valve 402 corresponding to the flow control signal 810. In one example, the control module 802 reduces the flow rate of hydraulic fluid passing through the flow control valve 402 based on the flow control signal 810. For instance, the control module 802 transmits the flow control signal 810 to reduce the flow rate of the hydraulic fluid through the flow control valve 402 to reduce the rotational speed of the motor output of the variable displacement hydraulic motor. In another example, the flow control signal 810 transmits a command to increase the flow of hydraulic fluid through the flow control valve 402 to increase the speed of the motor output of the variable displacement hydraulic motor.

One example of a method for performing pressure and flow control of a hydraulic system, such as the hydraulic system previously described in the examples herein and shown for instance in FIGS. 4-5. In describing the method 900, reference is made to one or more components, features, functions, and steps previously described herein. Where convenient, reference is made to the components, features, steps and the like with reference numerals. Reference numerals provided are exemplary and are nonexclusive. For instance, features, components, functions, steps, and the like described in the method 900 include, but are not limited to, the corresponding numbered elements provided herein. Other corresponding features described herein (both numbered and unnumbered) as well as their equivalents are also considered.

At 902, the method 900 includes measuring a pressure differential across the flow control valve 402. For instance the pressure differential is measured by the difference in the hydraulic fluid pressures at the system pressure sensor 406 (e.g., upstream of the flow control valve 402) and at the motor inlet pressure sensor 404 (e.g., downstream of the flow control valve 402). In one example, the pressure differential across the flow control valve 402 includes measuring the motor inlet pressure and comparing the measured motor inlet pressure with a hydraulic system pressure set point. For instance, the hydraulic system pressure set point includes, but is not limited to, the pressure output characteristic (e.g., system pressure 612 as discussed with respect to the example of FIG. 6) of the hydraulic pump 112.

At 904, the method 900 includes changing the displacement of a variable displacement hydraulic motor (e.g., the motor associated with either of the first or second hydraulic loads 106, 110) according to the measured pressure differential. Changing the displacement of the variable displacement hydraulic motor includes reducing the displacement of the variable displacement motor and correspondingly reducing the pressure differential across the flow control valve 402 (e.g., increasing the motor inlet pressure relative to the system pressure by way of back pressure from the motor to the valve 402). In one example, the displacement of the variable displacement hydraulic motor is reduced. Accordingly, the pressure differential is correspondingly reduced (because the motor inlet pressure is raised) and the flow rate of hydraulic fluid across the flow control valve 402 is reduced. In one example, changing the displacement of the variable hydraulic motor includes changing the motor inlet pressure to the hydraulic system pressure (including a match of the hydraulic system pressure or a value closer to the system pressure than an initial lower pressure associated with a larger displacement).

At 906, the motor output characteristic of the variable displacement hydraulic motor is measured. For instance the motor output characteristic is measured by a motor output sensor 710 and conveying a signal including the sensed value to a controller. The motor output sensor 710, in one example, detects the rotational speed of the motor output of the variable displacement hydraulic motor.

At 908, the flow rate of the hydraulic fluid through the flow control valve 402 is changed according to the measured motor output characteristic. As shown in FIG. 8, the control module 802 transmits a flow control signal 810 to the flow control valve 402. In one example, the measured motor output characteristic is higher than a desired value. For instance, the measured motor output characteristic is higher than the desired value for the motor output when the speed of the motor output of the variable displacement hydraulic motor is faster than a desired speed. The flow of hydraulic fluid across the flow control valve 402 is reduced (e.g., the valve is partially closed) to change the measured motor output characteristic to the desired value. In one example, changing the flow rate of hydraulic fluid includes, but is not limited to, changing the flow rate of hydraulic fluid to attain a desired motor output characteristic concurrently with changing the displacement of the variable displacement hydraulic motor. That is to say, both of the displacement of the variable displacement hydraulic motor (described herein) as well as the flow rate through the flow control valve 402 (described herein) are adjusted at the same time, for instance to transform the load to a high pressure low flow load and also facilitate control of the output of the load (e.g., rotational speed of the motor).

In one example, step 902 (measuring a pressure differential across a flow control valve 402) and step 904 (changing the displacement of a variable displacement hydraulic motor according to the pressure differential) are each conducted before, after, or concurrently with each of step 906 (measuring a motor output characteristic of the variable displacement hydraulic motor) and step 908 (changing the flow rate of hydraulic fluid through the flow control valve 402 according to the measured motor output characteristic).

In the example of FIG. 4, changing displacement of the variable displacement hydraulic motor and changing flow rate of hydraulic fluid delivered to the first hydraulic load 106 transforms the first hydraulic load 106 of a tool coupled with the variable displacement hydraulic motor from an initial first load low pressure characteristic and an initial first load high flow characteristic to a transformed first load high pressure characteristic and a transformed first load low flow characteristic. The transformed first load low flow characteristic is less than the initial first load high flow characteristic. As discussed herein, this transformation minimizes (reduces or eliminates) wasted power for the hydraulic pump (e.g., the pump 112 is operated at a lower flow rate, or a smaller pump 112 may be used in the system).

In the example shown in FIG. 5, the hydraulic system 500 includes a second hydraulic load 110 having a second load high pressure characteristic and a second load low flow characteristic. An initial flow composite of the initial first load high flow characteristic and the second load low flow characteristic is greater (and provides more wasted power for the pump 112) than a transformed flow composite of the transformed first load low flow characteristic and the second load low flow characteristic (both having high pressure load characteristics). Stated another way, the transformed second load low flow characteristic 610 and the second load high pressure characteristic 608 reduce the power required to operate the hydraulic pump 112 (according to the decreased flow rate).

In one example, the initial pressure composite of the initial first load low pressure characteristic (or second load low pressure characteristic 314) and the second load high pressure characteristic (or first load high pressure characteristic 308) is substantially the same as a transformed flow composite of the transformed first load high pressure characteristic 308 and the second load high pressure characteristic 608. Stated another way, transforming the second load (or first load) from a low pressure characteristic load to a high pressure characteristic nearer to an existing higher pressure characteristic of another load does not require an additional input of power from the system including the hydraulic pump 112. Instead, meeting the pressure requirement for one of the loads (the highest between the two) is sufficient to also meet the pressure requirement of the other load while the overall flow rate is decreased between the initial and transformed configurations.

Various Notes & Examples

Example 1 can include subject matter such as can include A hydraulic system comprising: a hydraulic circuit including: a first hydraulic load configured for communication with a hydraulic pump, the first hydraulic load having a first load high pressure characteristic and a first load low flow characteristic, and a second hydraulic load configured for communication with the hydraulic pump, the second hydraulic load having an initial second load low pressure characteristic and an initial second load high flow characteristic with respect to the first hydraulic load, the second hydraulic load including a variable displacement hydraulic motor; and a displacement and flow controller associated with the second hydraulic load, the displacement and flow controller configured to: change displacement of the variable displacement hydraulic motor according to a pressure difference across a flow control valve between a hydraulic system pressure and a measured motor inlet pressure at a motor inlet of the variable displacement hydraulic motor, change a flow rate of hydraulic fluid through the flow control valve according to a measured output characteristic of the hydraulic motor, and wherein the change in displacement and the change in flow rate transform the initial second load low pressure and high flow characteristics into transformed second load high pressure and low flow characteristics nearer to the first load high pressure characteristic and the first load low flow characteristic.

Example 2 can include, or can optionally be combined with the subject matter of Example 1 to optionally include a motor inlet pressure sensor coupled with the motor inlet and interposed between the variable displacement hydraulic motor and the flow control valve, the motor inlet pressure sensor configured to measure the motor inlet pressure at the motor inlet.

Example 3 can include, or can optionally be combined with the subject matter of Examples 1 or 2 to optionally include a system pressure sensor upstream from the flow control valve, the system pressure sensor configured to measure the hydraulic system pressure of the hydraulic system, and wherein the displacement and flow controller is configured to change displacement according to the pressure difference across the flow control valve based on the measured hydraulic system pressure measured by the system pressure sensor and the measured motor inlet pressure.

Example 4 can include, or can optionally be combined with the subject matter of Examples 1-3 to optionally include a speed sensor coupled with a motor output of the variable displacement hydraulic motor, wherein the measured output characteristic includes rotational speed of the motor output and the speed sensor is configured to measure the rotational speed, and wherein the displacement and flow controller is configured to change the flow rate of hydraulic fluid according to the measured rotation speed.

Example 5 can include, or can optionally be combined with the subject matter of Examples 1-4 to optionally include wherein an initial composite of the first load low flow characteristic and the second load high flow characteristic is greater than a final composite of a first load flow characteristic and the transformed second low flow characteristic.

Example 6 can include, or can optionally be combined with the subject matter of Example 1-5, to optionally include A hydraulic system comprising: a hydraulic circuit including: a first hydraulic load configured for communication with a hydraulic pump, the first hydraulic load having a first load high pressure characteristic and a first load low flow characteristic, and a second hydraulic load configured for communication with the hydraulic pump, the second hydraulic load having an initial second load low pressure characteristic and an initial second load high flow characteristic with respect to the first hydraulic load, the second hydraulic load including a variable displacement hydraulic motor; and a displacement and flow controller associated with the second hydraulic load, the displacement and flow controller configured to: change displacement of the variable displacement hydraulic motor according to a pressure difference across a flow control valve between a hydraulic system pressure and a measured motor inlet pressure at a motor inlet of the variable displacement hydraulic motor, change a flow rate of hydraulic fluid through the flow control valve according to a measured output characteristic of the hydraulic motor, and wherein the change in displacement and the change in flow rate transform the initial second load low pressure and high flow characteristics into a transformed second load high pressure characteristic near to the hydraulic system pressure and a transformed second load low flow characteristic less than the initial second load high flow characteristic.

Example 7 can include, or can optionally be combined with the subject matter of one or any combination of Examples 1-6 to optionally include wherein the first hydraulic load includes at least one coulter downforce cylinder and piston assembly.

Example 8 can include, or can optionally be combined with the subject matter of one or any combination of Examples 1-7 to optionally include wherein the second hydraulic load includes a seeder fan coupled with a motor output of the variable displacement hydraulic motor.

Example 9 can include, or can optionally be combined with the subject matter of one or any combination of Examples 1-8 optionally to include wherein the variable displacement hydraulic motor includes a plurality of variable displacement hydraulic motors and tools coupled with each of the motor outputs of the plurality of variable displacement hydraulic motors.

Example 10 can include, or can optionally be combined with the subject matter of Examples 1-9 to optionally include a motor inlet pressure sensor coupled with the motor inlet and interposed between the variable displacement hydraulic motor and the flow control valve, the motor inlet pressure sensor configured to measure the motor inlet pressure at the motor inlet.

Example 11 can include, or can optionally be combined with the subject matter of Examples 1-10 to optionally include a system pressure sensor upstream from the flow control valve, the system pressure sensor configured to measure the hydraulic system pressure of the hydraulic system, and wherein the displacement and flow controller is configured to change displacement according to the pressure difference across the flow control valve based on the measured hydraulic system pressure measured by the system pressure sensor and the measured motor inlet pressure.

Example 12 can include, or can optionally be combined with the subject matter of Examples 1-11 to optionally include a speed sensor coupled with a motor output of the variable displacement hydraulic motor, wherein the measured output characteristic includes rotational speed of the motor output and the speed sensor is configured to measure the rotational speed, and wherein the displacement and flow controller is configured to change the flow rate of hydraulic fluid according to the measured rotation speed.

Example 13 can include, or can optionally be combined with the subject matter of Examples 1-12 to optionally include wherein an initial composite of the first load low flow characteristic and the second load high flow characteristic is greater than a final composite of a first load flow characteristic and the transformed second low flow characteristic.

Example 14 can include, or can optionally be combined with the subject matter of Examples 1-13 to optionally include wherein a system pressure of the hydraulic system is substantially equal to the first load high pressure characteristic with the second hydraulic load having either of the initial second load low pressure characteristic or the transformed second load high pressure characteristic.

Example 15 can include, or can optionally be combined with the subject matter of Examples 1-14 to optionally include a load based pressure and flow control system comprising: a variable displacement hydraulic motor including a motor inlet and a motor outlet; a flow control valve coupled with the motor inlet; a motor inlet pressure sensor interposed between the variable displacement hydraulic motor and the flow control valve, the motor inlet pressure sensor configured to measure a motor inlet pressure at the motor inlet; an output sensor coupled with a motor output of the variable displacement hydraulic motor, the output sensor configured to measure an output characteristic of the variable displacement hydraulic motor; and a displacement and flow controller, the displacement and flow controller configured to: change displacement of the variable displacement hydraulic motor according to a pressure difference across the flow control valve between the measured motor inlet pressure and a hydraulic system pressure, and change a flow rate of hydraulic fluid through the flow control valve according to the measured output characteristic of the hydraulic motor.

Example 16 can include, or can optionally be combined with the subject matter of Examples 1-15 to optionally include wherein the displacement and flow controller is configured to change displacement of the variable displacement hydraulic motor and change the flow rate of hydraulic fluid including: changing the motor inlet pressure to near the hydraulic system pressure, and changing the flow rate of hydraulic fluid to attain a desired target output characteristic concurrently with changing the motor inlet pressure.

Example 17 can include, or can optionally be combined with the subject matter of Examples 1-16 to optionally include wherein the displacement and flow controller is configured to decrease displacement of the variable displacement hydraulic motor and decrease the pressure difference across the flow control valve, the decreased displacement increasing the measured motor inlet pressure.

Example 18 can include, or can optionally be combined with the subject matter of Examples 1-17 to optionally include wherein the displacement and flow controller is configured to change the flow rate of hydraulic fluid according to the measured output characteristic of the hydraulic motor as the displacement of the variable displacement hydraulic motor is changed.

Example 19 can include, or can optionally be combined with the subject matter of Examples 1-18 to optionally include wherein the motor output is coupled with a tool requiring an initial load low pressure characteristic and an initial load high flow characteristic, and the displacement and flow controller is configured to transform the initial load low pressure and initial load high flow characteristics to a transformed load high pressure characteristic and a transformed load low flow characteristic.

Example 20 can include, or can optionally be combined with the subject matter of Examples 1-19 to optionally include wherein with the changed displacement and flow rate of the displacement and flow controller: hydraulic fluid consumption of the variable displacement hydraulic motor is decreased with the transformed load low flow characteristic relative to the initial load high flow characteristic, and a target value of the output characteristic of the variable displacement hydraulic motor is maintained between the initial load low pressure and initial load high flow characteristics and the transformed load high pressure and load low flow characteristic characteristics.

Example 21 can include, or can optionally be combined with the subject matter of Examples 1-20 to optionally include wherein the flow control valve includes a pulse width modulation valve.

Example 22 can include, or can optionally be combined with the subject matter of Examples 1-21 to optionally include wherein the motor output is coupled with a seeder fan.

Example 23 can include, or can optionally be combined with the subject matter of Examples 1-22 to optionally include wherein the output sensor includes a speed sensor, and the measured output characteristic includes rotational speed of the motor output and the speed sensor is configured to measure the rotational speed, and wherein the displacement and flow controller is configured to change the flow rate of hydraulic fluid according to the measured rotation speed.

Example 24 can include, or can optionally be combined with the subject matter of Examples 1-23 to optionally include wherein the variable displacement hydraulic motor includes a plurality of variable displacement hydraulic motors and tools coupled with each of the motor outputs of the plurality of variable displacement hydraulic motors.

Example 25 can include, or can optionally be combined with the subject matter of Examples 1-24 to optionally include a system pressure sensor upstream from the flow control valve, the system pressure sensor configured to measure the hydraulic system pressure of the hydraulic system, and wherein the displacement and flow controller is configured to change displacement according to the pressure difference across the flow control valve based on the measured hydraulic system pressure measured by the system pressure sensor and the measured motor inlet pressure.

Example 26 can include, or can optionally be combined with the subject matter of Examples 1-25 to optionally include a method of performing pressure and flow control of a hydraulic system comprising: measuring a pressure difference across a flow control valve between a hydraulic system pressure and a motor inlet pressure, the flow control valve upstream from a variable displacement hydraulic motor, the variable displacement hydraulic motor including a motor inlet; changing displacement of the variable displacement hydraulic motor according to the measured pressure difference, changing the displacement includes decreasing the pressure difference; measuring a motor output characteristic of the variable displacement hydraulic motor; and changing a flow rate of hydraulic fluid through the flow control valve according to the measured motor output characteristic.

Example 27 can include, or can optionally be combined with the subject matter of Examples 1-26 to optionally include wherein measuring the pressure difference across the flow control valve includes measuring a hydraulic system pressure and a motor inlet pressure with pressure sensors.

Example 28 can include, or can optionally be combined with the subject matter of Examples 1-27 to optionally include wherein measuring the pressure difference across the flow control valve includes measuring the motor inlet pressure and comparing the measured motor inlet pressure with a hydraulic system pressure set point.

Example 29 can include, or can optionally be combined with the subject matter of Examples 1-28 to optionally include wherein changing displacement of the variable displacement hydraulic motor increases pressure between the variable displacement hydraulic motor and the flow control valve to decrease the pressure difference.

Example 30 can include, or can optionally be combined with the subject matter of Examples 1-29 to optionally include wherein measuring the motor output characteristic includes measuring a rotational speed of an output shaft of the variable displacement hydraulic motor.

Example 31 can include, or can optionally be combined with the subject matter of Examples 1-30 to optionally include wherein the changing displacement of the variable hydraulic motor includes changing the motor inlet pressure to near the hydraulic system pressure.

Example 32 can include, or can optionally be combined with the subject matter of Examples 1-31 to optionally include wherein changing the flow rate of hydraulic fluid includes changing the flow rate of hydraulic fluid to attain a desired motor output characteristic concurrently with changing displacement of the variable displacement hydraulic motor.

Example 33 can include, or can optionally be combined with the subject matter of Examples 1-32 to optionally include wherein changing displacement and changing flow rate transforms a first hydraulic load of a tool coupled with the variable displacement hydraulic motor from an initial first load low pressure characteristic and an initial first load high flow characteristic to a transformed first load high pressure characteristic and a transformed first load low flow characteristic, the transformed first load low flow characteristic less than the initial first load high flow characteristic.

Example 34 can include, or can optionally be combined with the subject matter of Examples 1-33 to optionally include wherein the hydraulic system includes a second hydraulic load having a second load high pressure characteristic and a second load low flow characteristic, and an initial flow composite of the initial first load high flow characteristic and the second load low flow characteristic is greater than a transformed flow composite of the transformed first load low flow characteristic and the second load low flow characteristic.

Example 35 can include, or can optionally be combined with the subject matter of Examples 1-34 to optionally include wherein an initial pressure composite of the initial first load low pressure characteristic and the second load high pressure characteristic is substantially the same as a transformed flow composite of the transformed first load high pressure characteristic and the second load high pressure characteristic.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A hydraulic system comprising:

a hydraulic circuit including:

a first hydraulic load configured for communication with a hydraulic pump, the first hydraulic load having a first load high pressure characteristic and a first load low flow characteristic, and a second hydraulic load configured for communication with the hydraulic pump, the second hydraulic load having an initial second load low pressure characteristic and an initial second load high flow characteristic with respect to the first hydraulic load, the second hydraulic load including a variable displacement hydraulic motor; and a displacement and flow controller associated with the second hydraulic load, the displacement and flow controller configured to:

change displacement of the variable displacement hydraulic motor according to a pressure difference across a flow control valve between a hydraulic system pressure and a measured motor inlet pressure at a motor inlet of the variable displacement hydraulic motor, change a flow rate of hydraulic fluid through the flow control valve according to a measured output characteristic of the hydraulic motor, and wherein the change in displacement and the change in flow rate transform the initial second load low pressure and high flow characteristics into transformed second load high pressure and low flow characteristics nearer to the first load high pressure characteristic and the first load low flow characteristic.

2. The hydraulic system of claim 1 comprising a motor inlet pressure sensor coupled with the motor inlet and interposed between the variable displacement hydraulic motor and the flow control valve, the motor inlet pressure sensor configured to measure the motor inlet pressure at the motor inlet.

3. The hydraulic system of claim 2 comprising a system pressure sensor upstream from the flow control valve, the system pressure sensor configured to measure the hydraulic system pressure of the hydraulic system, and wherein the displacement and flow controller is configured to change displacement according to the pressure difference across the flow control valve based on the measured hydraulic system pressure measured by the system pressure sensor and the measured motor inlet pressure.

4. The hydraulic system of claim 1 comprising a speed sensor coupled with a motor output of the variable displacement hydraulic motor, wherein the measured output characteristic includes rotational speed of the motor output and the speed sensor is configured to measure the rotational speed, and wherein the displacement and flow controller is configured to change the flow rate of hydraulic fluid according to the measured rotation speed.

5. The hydraulic system of claim 1, wherein an initial composite of the first load low flow characteristic and the second load high flow characteristic is greater than a final composite of a first load flow characteristic and the transformed second low flow characteristic.

6. A hydraulic system comprising:

a hydraulic circuit including:

a first hydraulic load configured for communication with a hydraulic pump, the first hydraulic load having a first load high pressure characteristic and a first load low flow characteristic, and a second hydraulic load configured for communication with the hydraulic pump, the second hydraulic load having an initial second load low pressure characteristic and an initial second load high flow characteristic with respect to the first hydraulic load, the second hydraulic load including a variable displacement hydraulic motor; and a displacement and flow controller associated with the second hydraulic load, the displacement and flow controller configured to:

change displacement of the variable displacement hydraulic motor according to a pressure difference across a flow control valve between a hydraulic system pressure and a measured motor inlet pressure at a motor inlet of the variable displacement hydraulic motor, change a flow rate of hydraulic fluid through the flow control valve according to a measured output characteristic of the hydraulic motor, and wherein the change in displacement and the change in flow rate transform the initial second load low pressure and high flow characteristics into a transformed second load high pressure characteristic near to the hydraulic system pressure and a transformed second load low flow characteristic less than the initial second load high flow characteristic.

7. The hydraulic system of claim 6, wherein the first hydraulic load includes at least one coulter downforce cylinder and piston assembly.

8. The hydraulic system of claim 6, wherein the second hydraulic load includes a seeder fan coupled with a motor output of the variable displacement hydraulic motor.

9. The hydraulic system of claim 6, wherein the variable displacement hydraulic motor includes a plurality of variable displacement hydraulic motors and tools coupled with each of the motor outputs of the plurality of variable displacement hydraulic motors.

10. The hydraulic system of claim 6 comprising a motor inlet pressure sensor coupled with the motor inlet and interposed between the variable displacement hydraulic motor and the flow control valve, the motor inlet pressure sensor configured to measure the motor inlet pressure at the motor inlet.

11. The hydraulic system of claim 10 comprising a system pressure sensor upstream from the flow control valve, the system pressure sensor configured to measure the hydraulic system pressure of the hydraulic system, and wherein the displacement and flow controller is configured to change displacement according to the pressure difference across the flow control valve based on the measured hydraulic system pressure measured by the system pressure sensor and the measured motor inlet pressure.

12. The hydraulic system of claim 6 comprising a speed sensor coupled with a motor output of the variable displacement hydraulic motor, wherein the measured output characteristic includes rotational speed of the motor output and the speed sensor is configured to measure the rotational speed, and wherein the displacement and flow controller is configured to change the flow rate of hydraulic fluid according to the measured rotation speed.

13. The hydraulic system of claim 6, wherein an initial composite of the first load low flow characteristic and the second load high flow characteristic is greater than a final composite of a first load flow characteristic and the transformed second low flow characteristic.

14. The hydraulic system of claim 6, wherein a system pressure of the hydraulic system is substantially equal to the first load high pressure characteristic with the second hydraulic load having either of the initial second load low pressure characteristic or the transformed second load high pressure characteristic.

15. A load based pressure and flow control system comprising:

a variable displacement hydraulic motor including a motor inlet and a motor outlet;

a flow control valve coupled with the motor inlet;

a motor inlet pressure sensor interposed between the variable displacement hydraulic motor and the flow control valve, the motor inlet pressure sensor configured to measure a motor inlet pressure at the motor inlet;

an output sensor coupled with a motor output of the variable displacement hydraulic motor, the output sensor configured to measure an output characteristic of the variable displacement hydraulic motor; and a displacement and flow controller, the displacement and flow controller configured to:

change displacement of the variable displacement hydraulic motor according to a pressure difference across the flow control valve between the measured motor inlet pressure and a hydraulic system pressure, and change a flow rate of hydraulic fluid through the flow control valve according to the measured output characteristic of the hydraulic motor.

16. The load based pressure and flow control system of claim 15, wherein the displacement and flow controller is configured to change displacement of the variable displacement hydraulic motor and change the flow rate of hydraulic fluid including:

changing the motor inlet pressure to near the hydraulic system pressure, and changing the flow rate of hydraulic fluid to attain a desired target output characteristic concurrently with changing the motor inlet pressure.

17. The load based pressure and flow control system of claim 15, wherein the displacement and flow controller is configured to decrease displacement of the variable displacement hydraulic motor and decrease the pressure difference across the flow control valve, the decreased displacement increasing the measured motor inlet pressure.

18. The load based pressure and flow control system of claim 15, wherein the displacement and flow controller is configured to change the flow rate of hydraulic fluid according to the measured output characteristic of the hydraulic motor as the displacement of the variable displacement hydraulic motor is changed.

19. The load based pressure and flow control system of claim 15, wherein the motor output is coupled with a tool requiring an initial load low pressure characteristic and an initial load high flow characteristic, and the displacement and flow controller is configured to transform the initial load low pressure and initial load high flow characteristics to a transformed load high pressure characteristic and a transformed load low flow characteristic.

20. The load based pressure and flow control system of claim 19, wherein with the changed displacement and flow rate of the displacement and flow controller:

hydraulic fluid consumption of the variable displacement hydraulic motor is decreased with the transformed load low flow characteristic relative to the initial load high flow characteristic, and a target value of the output characteristic of the variable displacement hydraulic motor is maintained between the initial load low pressure and initial load high flow characteristics and the transformed load high pressure and transformed load low flow characteristics.

21. The load based pressure and flow control system of claim 15, wherein the flow control valve includes a pulse width modulation valve.

22. The load based pressure and flow control system of claim 15, wherein the motor output is coupled with a seeder fan.

23. The load based pressure and flow control system of claim 15, wherein the output sensor includes a speed sensor, and the measured output characteristic includes rotational speed of the motor output and the speed sensor is configured to measure the rotational speed, and wherein the displacement and flow controller is configured to change the flow rate of hydraulic fluid according to the measured rotation speed.

24. The load based pressure and flow control system of claim 15, wherein the variable displacement hydraulic motor includes a plurality of variable displacement hydraulic motors and tools coupled with each of the motor outputs of the plurality of variable displacement hydraulic motors.

25. The load based pressure and flow control system of claim 15 comprising a system pressure sensor upstream from the flow control valve, the system pressure sensor configured to measure the hydraulic system pressure of the hydraulic system, and wherein the displacement and flow controller is configured to change displacement according to the pressure difference across the flow control valve based on the measured hydraulic system pressure measured by the system pressure sensor and the measured motor inlet pressure.

26. A method of performing pressure and flow control of a hydraulic system comprising:

measuring a pressure difference across a flow control valve between a hydraulic system pressure and a motor inlet pressure, the flow control valve upstream from a variable displacement hydraulic motor, the variable displacement hydraulic motor including a motor inlet;

changing displacement of the variable displacement hydraulic motor according to the measured pressure difference, changing the displacement includes decreasing the pressure difference;

measuring a motor output characteristic of the variable displacement hydraulic motor; and changing a flow rate of hydraulic fluid through the flow control valve according to the measured motor output characteristic.

27. The method of claim 26, wherein measuring the pressure difference across the flow control valve includes measuring a hydraulic system pressure and a motor inlet pressure with pressure sensors.

28. The method of claim 26, wherein measuring the pressure difference across the flow control valve includes measuring the motor inlet pressure and comparing the measured motor inlet pressure with a hydraulic system pressure set point.

29. The method of claim 26, wherein changing displacement of the variable displacement hydraulic motor increases pressure between the variable displacement hydraulic motor and the flow control valve to decrease the pressure difference.

30. The method of claim 26, wherein measuring the motor output characteristic includes measuring a rotational speed of an output shaft of the variable displacement hydraulic motor.

31. The method of claim 26, wherein the changing displacement of the variable hydraulic motor includes changing the motor inlet pressure to near the hydraulic system pressure.

32. The method of claim 26, wherein changing the flow rate of hydraulic fluid includes changing the flow rate of hydraulic fluid to attain a desired motor output characteristic concurrently with changing displacement of the variable displacement hydraulic motor.

33. The method of claim 26, wherein changing displacement and changing flow rate transforms a first hydraulic load of a tool coupled with the variable displacement hydraulic motor from an initial first load low pressure characteristic and an initial first load high flow characteristic to a transformed first load high pressure characteristic and a transformed first load low flow characteristic, the transformed first load low flow characteristic being less than the initial first load high flow characteristic.

34. The method of claim 33, wherein the hydraulic system includes a second hydraulic load having a second load high pressure characteristic and a second load low flow characteristic, and an initial flow composite of the initial first load high flow characteristic and the second load low flow characteristic is greater than a transformed flow composite of the transformed first load low flow characteristic and the second load low flow characteristic.

35. The method of claim 34, wherein an initial pressure composite of the initial first load low pressure characteristic and the second load high pressure characteristic is substantially the same as a transformed flow composite of the transformed first load high pressure characteristic and the second load high pressure characteristic.

* * * * *